United States Patent
Nakamura

(10) Patent No.: US 8,402,936 B2
(45) Date of Patent: Mar. 26, 2013

(54) VEHICLE CONTROL DEVICE AND METHOD FOR IDLE STOP CONTROL FOR THE SAME

(75) Inventor: Kazuo Nakamura, Obu (JP)

(73) Assignee: Denso Corporation, Kariya (JP)

( * ) Notice: Subject to any disclaimer, the term of this patent is extended or adjusted under 35 U.S.C. 154(b) by 289 days.

(21) Appl. No.: 12/924,104

(22) Filed: Sep. 21, 2010

(65) Prior Publication Data

US 2011/0005486 A1     Jan. 13, 2011

(30) Foreign Application Priority Data

Nov. 4, 2009   (JP) .................. 2009-253341

(51) Int. Cl.
  *F02N 11/08*       (2006.01)
(52) U.S. Cl. .............. 123/179.4; 123/322; 123/325; 123/347; 701/112; 701/33.4; 701/412
(58) Field of Classification Search ............... 123/179.4, 123/322, 325, 347; 701/112, 33.4, 412
See application file for complete search history.

(56) References Cited

U.S. PATENT DOCUMENTS

| | | | | |
|---|---|---|---|---|
| 6,768,944 | B2 * | 7/2004 | Breed et al. ............ | 701/301 |
| 7,079,940 | B2 * | 7/2006 | Scholt et al. ............ | 701/112 |
| 7,421,334 | B2 * | 9/2008 | Dahlgren et al. ......... | 701/117 |
| 7,426,437 | B2 * | 9/2008 | Breed et al. ............ | 701/301 |
| 2003/0016143 | A1 * | 1/2003 | Ghazarian ............... | 340/901 |
| 2007/0208501 | A1 * | 9/2007 | Downs et al. ............ | 701/119 |

FOREIGN PATENT DOCUMENTS

| | | |
|---|---|---|
| JP | 8-61110 | 3/1996 |
| JP | 2001-50076 | 2/2001 |
| JP | 2001-207883 | 8/2001 |
| JP | 2002-303173 | 10/2002 |
| JP | 2004-132333 | 4/2004 |
| JP | 2004-169664 | 6/2004 |
| JP | 2006-224809 | 8/2006 |
| JP | 2009-30571 | 2/2009 |

OTHER PUBLICATIONS

Office action dated Sep. 13, 2011 in corresponding Japanese Application No. 2009-253341.

* cited by examiner

*Primary Examiner* — Stephen K Cronin
*Assistant Examiner* — Joseph Dallo
(74) *Attorney, Agent, or Firm* — Harness, Dickey & Pierce, PLC

(57) ABSTRACT

A vehicle control device for a vehicle system automatically stops an internal combustion engine of a vehicle when a predetermined stop condition is satisfied and automatically starts the automatically stopped internal combustion engine when a predetermined start condition is satisfied. A stop point detection unit detects a stop point, at which the vehicle possibly stops, while the vehicle travels based on map information stored in a map information storage unit. A traveling information control unit stores traveling information, which includes a state of the vehicle stopping at a stop point and a state of the vehicle passing by the stop point, in the traveling information storage unit. A stop determination unit determines whether to stop the internal combustion engine when the vehicle stops at a stop point based on the traveling information of the stop point stored in the traveling information storage unit.

12 Claims, 5 Drawing Sheets

VEHICLE CONTROL DEVICE AND METHOD FOR IDLE STOP CONTROL FOR THE SAME

CROSS REFERENCE TO RELATED APPLICATIONS

This application is based on and incorporates herein by reference Japanese Patent Application No. 2009-253341 filed on Nov. 4, 2009.

FIELD OF THE INVENTION

The present invention relates to a vehicle control device for a vehicle system configured to automatically stop an internal combustion engine when a predetermined stop condition is satisfied and automatically start the automatically stopped internal combustion engine when a predetermined start condition is satisfied. The present invention further relates to a method for an idle stop control of the vehicle control device.

BACKGROUND OF THE INVENTION

Conventionally, a vehicle system automatically stops an internal combustion engine when a predetermined stop condition is satisfied while a vehicle travels. Specifically, a known idle stop system stops injection of fuel from a fuel injection valve to automatically stop an internal combustion engine when a vehicle speed of a vehicle becomes zero and the vehicle stops. It is noted that even when a vehicle stops and an internal combustion engine turns to an idle stop condition, the internal combustion engine in an idle stop condition may be immediately started to start the vehicle due to a stop condition caused by a halt point (temporary stop) on the road or change of a state of a traffic signal. In general, it is considered that fuel consumption may not be reduced unless the internal combustion engine is stopped for more than a predetermined period such as 5 seconds when performing such an idle stop. Therefore, when an idle stop time period is short, fuel consumption may be increased contrary.

For example, when a vehicle repeats traveling on the same path such as a commutation route, a stop period of the vehicle is considered short when the vehicle stops. For example, JP-A-2004-132333 discloses an art to beforehand configure a navigation device to prohibit idle stop in such an area thereby to avoid unnecessary idle stop. JP-A-2004-132333 further exemplifies an art to prohibit idle stop according to an assigned area in which idle stop is prohibited in accordance with a personal tendency. It is noted that in the art of JP-A-2004-132333, a user needs to beforehand assign an area in which idle stop is prohibited. Consequently, operation of the device is complicated. In addition, such an area, in which idle stop is prohibited, may include a stop point at which an actual stop period is long sufficiently to reduce fuel consumption by idle stop. As described above, when idle stop is uniformly prohibited, a fuel consumption reduction effect may not be appropriately caused by idle stop.

SUMMARY OF THE INVENTION

In view of the foregoing and other problems, it is an object of the present invention to produce a vehicle control device configured to determine whether to automatically stop an internal combustion engine at a stop point at which a vehicle stops. It is another object of the present invention to produce a method for an idle stop control of the vehicle control device.

According to one aspect of the present invention, a vehicle control device for a vehicle system configured to automatically stop an internal combustion engine of a vehicle when a predetermined stop condition is satisfied and automatically start the automatically stopped internal combustion engine when a predetermined start condition is satisfied, the vehicle control device comprises a stop point detection unit configured to detect a stop point, at which the vehicle possibly stops, based on map information stored in a map information storage unit, while the vehicle travels. The vehicle control device further comprises a traveling information control unit configured to store traveling information, which includes a state of the vehicle stopping at a stop point and a state of the vehicle passing by the stop point, in the traveling information storage unit. The vehicle control device further comprises a stop determination unit configured to determine whether to stop the internal combustion engine when the vehicle stops at a stop point based on the traveling information of the stop point stored in the traveling information storage unit.

According to another aspect of the present invention, a method for an idle stop control of a vehicle control device for a vehicle system configured to automatically stop an internal combustion engine of a vehicle when a predetermined stop condition is satisfied and automatically start the automatically stopped internal combustion engine when a predetermined start condition is satisfied, the method comprises of detecting a stop point, at which the vehicle possibly stops, based on stored map information, while the vehicle travels. The method further comprises of determining whether to stop the internal combustion engine, when the vehicle stops at the stop point, based on stored traveling information of the stop point, the traveling information including a state of the vehicle stopping at a stop point and a state of the vehicle passing by the stop point.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

As follows, an embodiment of the present invention will be described with reference to drawings.

(First Embodiment)

Figure 1:
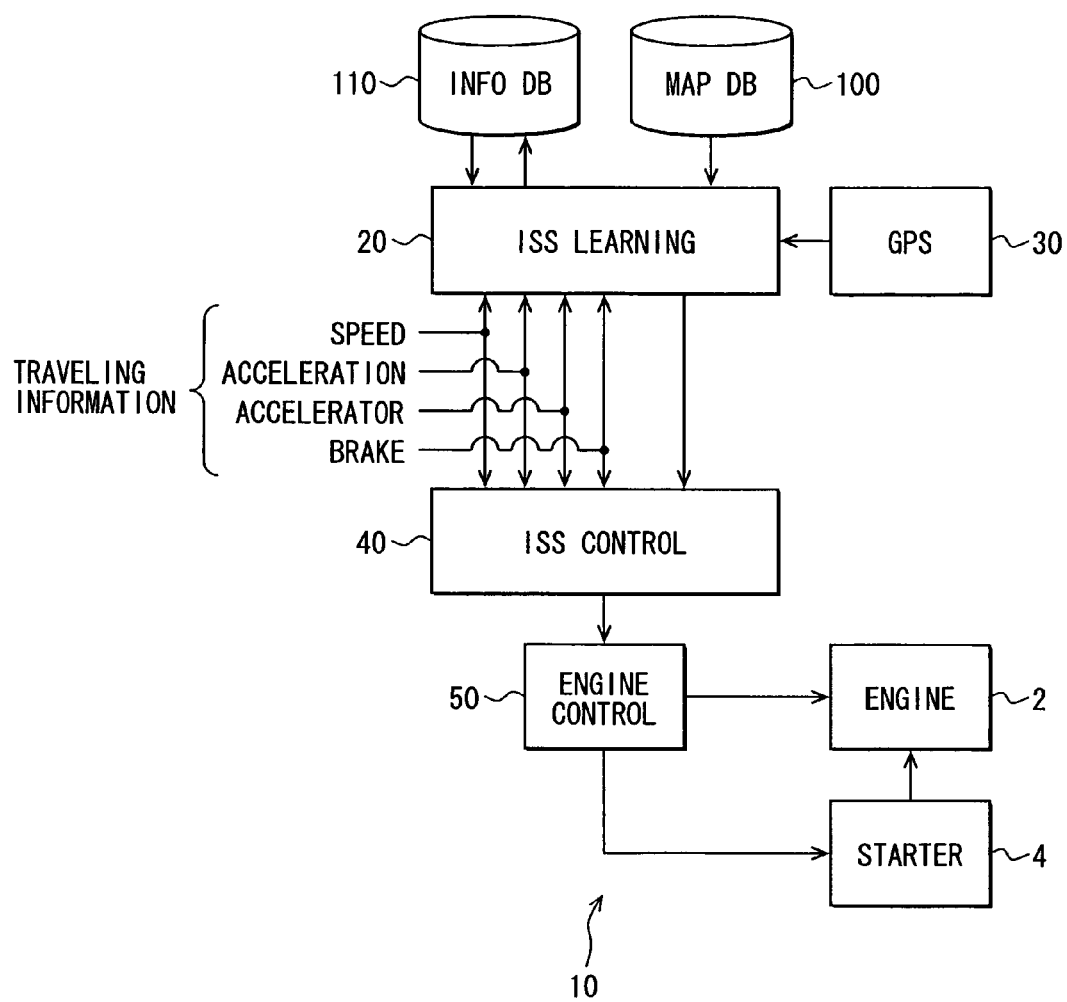
FIG. 1 is a block diagram showing an idle stop system according to a first embodiment.

FIG. 1 shows an idle stop system according to the first embodiment of the present invention.

(Idle Stop System 10)

An idle stop system (ISS) 10 of the present embodiment is a vehicle system to perform automatic stop to stop fuel injection from a fuel injection valve (not shown) thereby to stop an internal combustion engine (engine) 2 without deactivating an engine start switch device when determining that a predetermined stop condition is satisfied according to a traveling state of a vehicle. The idle stop system 10 further performs automatic start to start the engine 2 by activating a driving starter 4 from an automatically stopped state when a predetermined start condition is satisfied.

The idle stop system 10 is mainly configured of a microcomputer including a CPU, a RAM, a ROM, a flash memory, a hard disk drive (HDD), a communication interface, and the like (none shown). The idle stop system 10 includes an ISS learning unit 20, a GPS positioning unit 30, an ISS control unit 40, and an engine control unit 50.

The ISS learning unit 20 detects a stop point, at which a traveling vehicle may stop, on a road, on which the vehicle travels, from a map information database (DB) 100. The stop point includes an intersection with a traffic signal, an intersection without a traffic signal, a non-intersection point with a traffic light, a merging point with a priority road, a halt point (temporarily stop point), and the like.

When the vehicle stops, the ISS learning unit 20 stores a stop time and a stop period in a traveling information DB 110, and when the vehicle passes a stop point, the ISS learning unit 20 stores a passing time in the traveling information DB 110, for each stop point and each direction (approach direction) in which the vehicle approaches the stop point. When the approach direction to a stop point is limited to one direction in a case where the vehicle is on a one-way street, for example, the approach direction may be excluded from the traveling information.

When it is determined that the vehicle stops at a stop point (stopping state) in a target stop range, a stop time and a stop period are stored in the traveling information DB 110. The target stop range may be the one stop point. Alternatively, the target stop range may be between a stop point and a predetermined point in advance of the stop point for a predetermined distance. The predetermined point in advance of the stop point for the predetermined distance may be arbitrary set according to a configuration of a street of the stop point.

For example, in the case of a halt point, a stopping state may be stored from a stop line to a predetermined point in advance of the stop line for, for example, 5 meters. Alternatively, in the case of an intersection with a traffic signal, a stopping state may be stored from a stop line to a predetermined point in advance of the stop line for, for example, 30 meters. The present determination of the distances from a stop line is made based on a reason that in the case of a holt point or an intersection with a traffic signal, a vehicle may stop behind several vehicles from a foremost vehicle. It is supposed that the number of vehicles stopping subsequently at an intersection with a traffic signal is greater than the number of vehicles stopping subsequently at a halt point.

The ISS learning unit 20 further calculates a traffic congestion degree as traffic congestion information based on a time period needed for reaching a subsequent stop point, a vehicle speed, and the number of vehicle stops in a range of the predetermined distance to the subsequent stop point. The traffic congestion degree is specified by a percentage or multiple levels such as high, middle, and low. The ISS learning unit 20 may obtain the traffic congestion degree as traffic congestion information from the VICS (registered trademark) or another ITS service. The ISS learning unit 20 stores the traffic congestion information as traveling information in the traveling information DB 110 in each of the case where the vehicle stops at a stop point and the case where the vehicle passes by a stop point.

For example, when the vehicle once stops at a stop point such as a traffic congestion and a halt point (temporary stop) and starts immediately after a short stop period, the ISS learning unit 20 may store the case not as a stop but as a restart after short stop in the traveling information DB 110. In this case, the ISS learning unit 20 may deem such a restart after short stop as a passing by a stop point and store as traveling information on the vehicle at a stop point. In the case of such a restart after short stop, the ISS learning unit 20 may store the case not as a stop or a restart after short stop but as a passing by a stop point in the traveling information DB 110.

The ISS learning unit 20 calculates a stop probability that the vehicle stops at a stop point based on traveling information on the vehicle stored in the traveling information DB 110. Specifically, the ISS learning unit 20 calculates a rate of the number of vehicle stops to the summation of the number of vehicle stops and the number of passing by a stop point and obtains the rate as the stop probability at a stop point.

The GPS positioning unit 30 is a part of the navigation device. The GPS positioning unit 30 receives a GPS signal from a GPS Satellite and obtains position information on the vehicle according to the GPS signal so as to detect the current position of the vehicle, a traveling direction of the vehicle, an altitude of the vehicle, and the like with high accuracy.

The ISS control unit 40 detects a traveling state of the vehicle based on an output signal of various sensors for detecting a vehicle speed, an acceleration, manipulation of an accelerator pedal, and manipulation of a brake pedal, and the like. The ISS control unit 40, determines whether the vehicle passes by a stop point or stops at a stop point based on the detected vehicle running state and the traveling information obtained from the ISS learning unit 20. When determining that the vehicle stops at a stop point, the ISS control unit 40 determines a stop period based on the detected vehicle running state and the traveling information.

When the vehicle stops at a stop point, the ISS control unit 40 determines whether to automatically stop the engine 2 at the stop point based on the traveling information obtained from the ISS learning unit 20.

At a stop point without a signal where roads connect to each other via an intersection, merging point, or the like, the ISS control unit 40 may determine whether the vehicle stops at the subsequent stop point or the vehicle passes by the subsequent stop point based on the priority according to the road classification of the connected road, in addition to calculating the stop probability according to the traveling information. The stop probability becomes high when the vehicle is joining to a priority road from a byroad. In this way, it can be determined whether the vehicle stops at a subsequent stop point or the vehicle passes by the subsequent stop point with high accuracy, even when the stop probability calculated according to the traveling information is the same.

The ISS control unit 40 may determine whether the vehicle stops at a subsequent stop point or the vehicle passes by the subsequent stop point, based on a result of stopping at a stop point and passing by a stop point on a path where the vehicle has passed to the subsequent stop point, in addition to calculation of the stop probability according to the traveling information.

For example, when the vehicle has stopped at three past intersections, the ISS control unit 40 determines whether the stop probability at the subsequent stop point becomes high or low according to the history of the traveling information. In this way, it can be determined whether the vehicle stops at a subsequent stop point or the vehicle passes by the subsequent stop point with high accuracy, even when the stop probability calculated according to the traveling information is the same.

As described above, the ISS control unit 40 determines whether the vehicle stops based on the signals of various sensors for detecting the vehicle speed, acceleration, manipulation of an accelerator pedal, and manipulation of a brake pedal. When the ISS control unit 40 determines that the vehicle stops at a subsequent stop point, the ISS control unit 40 may determine whether to stop the engine 2 at the subsequent stop-point based on the road classification and the traveling history, in addition to the traveling information obtained from traveling information DB 110.

When automatically stopping the engine 2, the ISS control unit 40 sends an instruction to the engine control unit 50 to control a fuel injection valve so as to cause the engine control unit 50 to automatically stop the engine 2. Subsequently, when the brake pedal is released in an automatic stop state, the ISS control unit 40 instructs a control of the starter 4 to the engine control unit 50 so as to cause the engine control unit 50 to performs an automatic start of the engine 2.

The engine control unit 50 controls a fuel injection quantity from the fuel injection valve to the engine 2 and starting of the engine 2 using the starter 4.

The map information DB 100 includes map data containing various data for destination search (destination data such as town page data (Japanese)), synthetic voice data, and the like. The map information DB 100 may be a large-scale storage medium such as a CD, a DVD, and an HDD.

The map data includes a road data group, a building data group, a geographical feature data group, and the like. In addition, the map data includes data for reproducing a map on a display device and character data for indicating characters representing names of famous places and buildings.

In the map data, a road is defined as a link, which connects one node with another node. The node data includes characteristic information of a node such as a node ID, which is an identification number of the node, coordinates of the node, road link IDs of all links connected to the node, a node classification, and the like. The node classification is, for example, an intersection and a junction. The link data includes various data including a road link ID, which is an identification number of the link, the link length, a node ID of each node connected to a start point and an end point of the like, a road classification, such as a highway, a toll road, and a local road, a road geometry, the width of the road, the road name, the number of lanes, a link traveling time, a legal limit, the slope of the road, and the like.

When the vehicle stops a stop point, the traveling information DB 110 stores a stop time and a stop period, and when the vehicle passes a stop point, the traveling information DB 110 stores a passing time, for each stop point and each direction in which the vehicle approaches the stop point.

Figure 2:
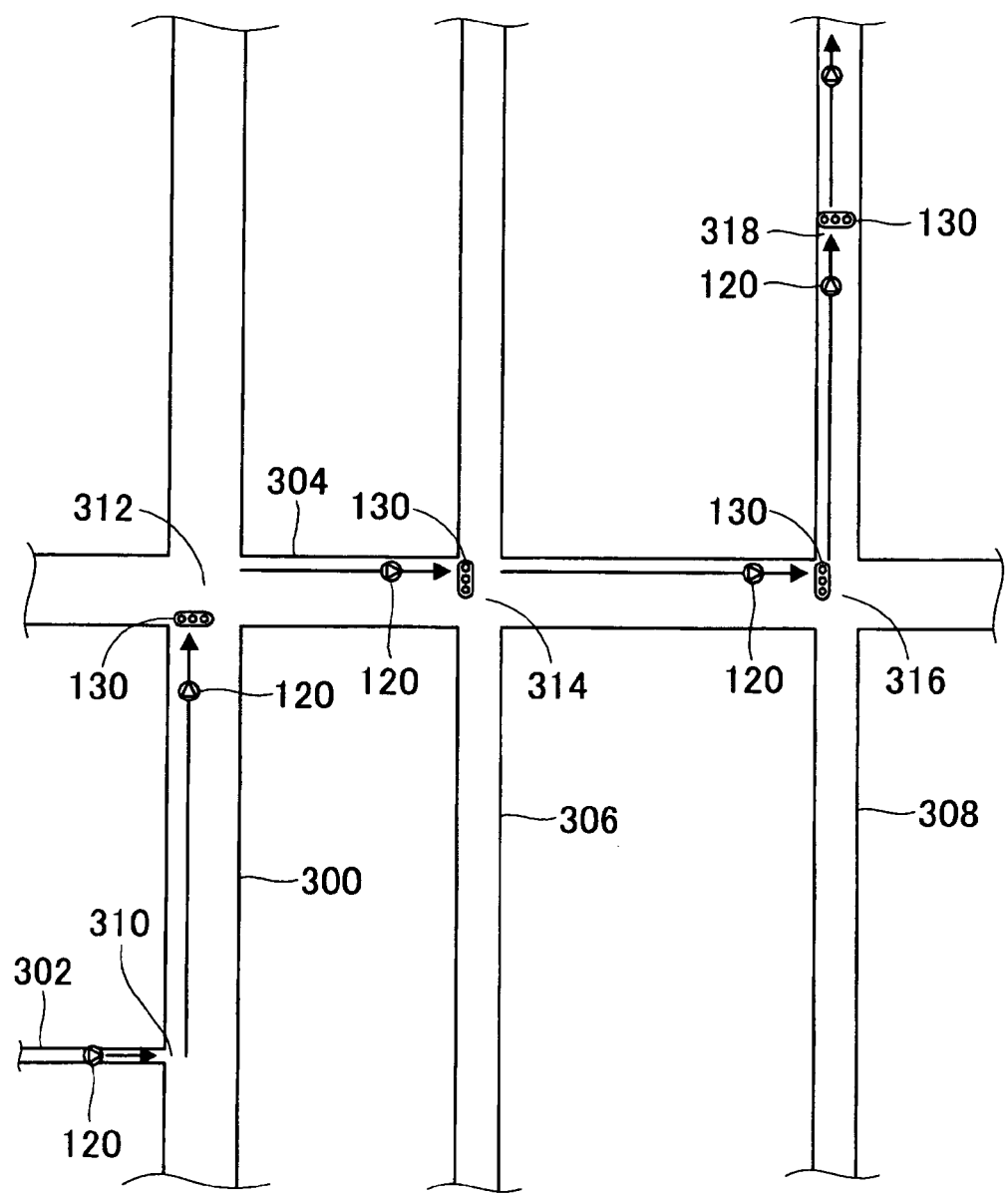
FIG. 2 is a schematic view showing a path on which a vehicle travels.

For example, in FIG. 2, the arrows show a path on which a vehicle 120 repeatedly travels for commutation or the like. The traveling information DB 110 stores, as a stop point, a point 310 via which the vehicle advances into a priority road 300 from a byroad 302, an intersection 312 between a road 300 and road a 304, an intersection 314 between the road 304 and road a 306, an intersection 316 between the road 304 and a road 308, a point 318 on which a traffic light (traffic signal) 130 is installed on the road 308.

The traveling information including a stop point, a stop time, a stop period, and a passing time are stored and accumulated in the traveling information DB 110 every time when the vehicle stops at a stop point or passes by the stop point. The traveling information may be classified at a time interval such'as 2 hours and stored. The time interval may be determined based on a stop time and a passing time. An average of the stop period may be calculated in a predetermined time period and stored as a representing value in the traveling information DB 110. An average of the traffic congestion degree may be calculated in a predetermined time period and stored as a representing value of the traffic congestion information in the traveling information DB 110.

(Traveling Information Storage Processing)

Figure 3:
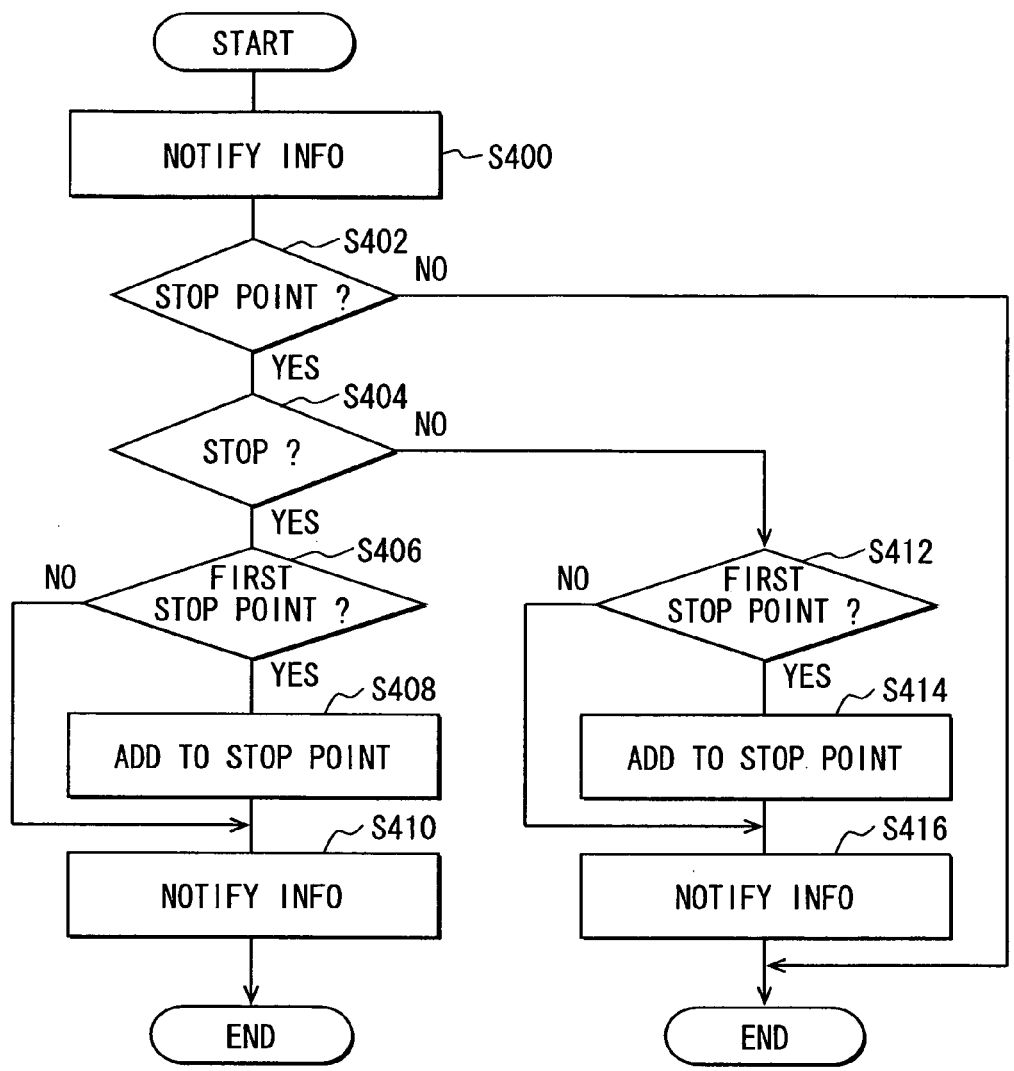
FIG. 3 is a flow chart showing a traveling information storage processing of the vehicle.

FIG. 3 is a flowchart showing a traveling information storage processing at a stop point. The traveling information storage processing of FIG. 3 is regularly executed. In FIG. 3, "S" represents "step."

At S400, every time the processing is executed, the ISS learning unit 20 notifies the ISS control unit 40 of information at a predetermined time interval until the vehicle reaches a subsequent stop point. The notified information includes the stop probability at the subsequent stop point, the traffic congestion degree until the vehicle reaches the stop point, and the remaining distance to the stop point. The ISS learning unit 20 obtains the stop probability at a stop point and the traffic congestion degree before the vehicle reaches the stop point from previous traveling information stored in the traveling information DB 110. The ISS learning unit 20 further obtains the remaining distance to the stop point from the positioning information of the GPS positioning unit 30.

At S402, the ISS learning unit 20 determines whether the vehicle has reached the stop point according to the positioning information of the GPS positioning unit 30. When the vehicle does not reach the stop point (S402: No), the ISS control unit 40 terminates the present processing. When the vehicle reaches the stop point (S402: Yes), at S404, the ISS learning unit 20 determines whether the vehicle has stopped at the stop point according to the vehicle speed.

As described above, the stop range for determining whether the vehicle has stopped at the stop point is not limited to only the one stop point and may be a stop range between a stop point and a predetermined point in advance of the stop point for a predetermined distance. The predetermined point in advance of the stop point for the predetermined distance may be arbitrary set according to a configuration of a street of the stop point.

When the vehicle stops at the stop point (S404: Yes), at S406, the ISS learning unit 20 determines whether the stop point is a first stop point. When the stop point is a first stop point (S406: Yes), at S408, the ISS learning unit 20 stores the stop point as a new stop point in the traveling information DB 110. Subsequently, the processing proceeds to S410

When the stop point is not a first stop point (S406: No), at S410, the ISS learning unit 20 stores information for each approach direction to the stop point in the traveling information DB 110. The information includes the stop time when stopping at the stop point, the stop period, the traffic congestion information on the road before the vehicle reaches the stop point. The information may include the approach direction. Thus, the processing is terminated.

In a case where the vehicle has reached the stop point and does not stop at the stop point (S404: No), the ISS learning unit 20 determines that the vehicle has passed the stop point. In this case, at S412, the ISS learning unit 20 determines whether the stop point is a first stop point. When the stop point is a first stop point (S412: Yes), at S414, the ISS learning unit 20 stores the stop point as a new stop point in the traveling information DB 110. Subsequently, the processing proceeds to S416.

When the stop point is not a first stop point (S412: No), at S416, the ISS learning unit 20 stores the information for each approach direction to the stop point in the traveling information DB 110. The information includes the passing time and the traffic congestion information on the road before the vehicle reaches the stop point. The information may include the approach direction. Thus, the processing is terminated.

(Engine Stop Determination Processing)

Figure 4:
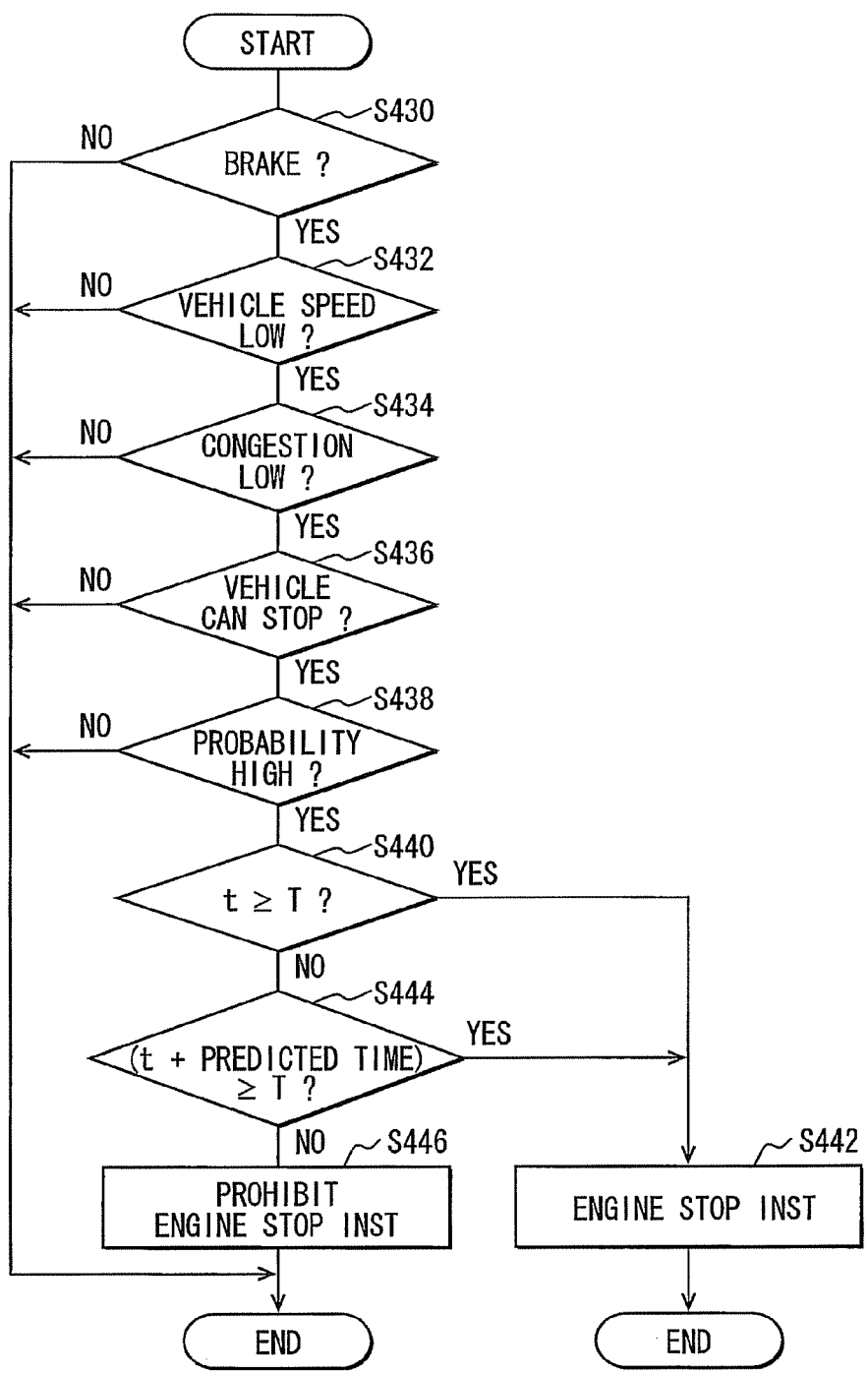
FIG. 4 is a flow chart showing a stop determination processing of an internal combustion engine.

FIG. 4 is a flowchart showing an engine stop determination processing for determining whether to stop the engine 2 before the vehicle stops at a stop point. The engine stop determination processing of FIG. 4 is regularly executed. In FIG. 4, "S" represents "step."

The ISS control unit 40 determines that the vehicle is going to stop in a predetermined distance range before a stop point due to a reason other than a traffic congestion in a case where: i) the brake pedal is depressed in the predetermined distance range before the subsequent stop point (S430: Yes); ii) the vehicle speed is less than a predetermined speed (S432: Yes); and iii) a previous traffic congestion degree to the subsequent stop point is low (S434: Yes). In this case, the processing proceeds to S436.

As described above, the ISS control unit 40 is notified from the ISS learning unit 20 of information until the vehicle reaches a subsequent stop point. The notified information includes the stop probability at the subsequent stop point, the traffic congestion degree before the vehicle reaches the stop point, and the remaining distance to the stop point.

The predetermined distance used for the determination at S430 may be arbitrary set according to a configuration of a road of the stop point. For example, the predetermined distance is set to about 5 meters when a stop point is a halt point. Alternatively, the predetermined distance is set to about 30 meters when a stop point is an intersection with a traffic signal. The previous traffic congestion to the subsequent stop point used for the determination at S434 is notified from the ISS learning unit 20 to the ISS control unit 40. When at least one of S430, S432, S434 makes a negative determination, the ISS control unit 40 terminates the present processing.

The ISS control unit 40 proceeds the processing to S440 in a condition where: i) the vehicle is determined to be capable of stopping at a stop point according to a rate of the deceleration quantity of the vehicle (S436: Yes); and ii) the stop probability at the subsequent stop point is greater than a predetermined value (S438: Yes). As described above, the stop probability at the stop point is notified from the ISS learning unit 20 to the ISS control unit 40.

The ISS control unit 40 terminates the present processing in a case where: i) the vehicle cannot stop at the stop point (S436: No); and ii) the stop probability of the stop point is less than a predetermined value (S438: No).

At S440, the ISS control unit 40 determines whether a predicted stop period t at the stop point is greater than or equal to a shortest fuel consumption efficient time period T (for example, 5 seconds). When the engine is automatically stopped for the shortest fuel consumption efficient time period T or more, fuel consumption becomes further efficient. The ISS control unit 40 obtains the predicted stop period t from the traveling information DB 110 via the ISS learning unit 20.

When the predicted stop period t is greater than or equal to the fuel consumption efficient time period T (S440: Yes), at S442, the ISS control unit 40 instructs the engine control unit 50 to stop the engine 2 before stopping at the stop point. Thus, the ISS control unit 40 terminates the present processing. In this way, the engine 2 is automatically stopped before the vehicle stops at the stop point. Thus, the engine 2 can be stopped for a time period longer than the fuel consumption efficient time period T. Consequently, fuel consumption can be reduced by automatically stopping the engine 2.

As described above, according to the first embodiment, the fuel consumption efficient time period T is predetermined to 5 seconds in determination whether to automatically stop the engine 2 based on the traveling information stored in the traveling information DB 110. Further, the fuel consumption efficient time period T of 5 seconds is compared with the predicted stop period for which the vehicle is predicted to be stopping. This is because an engine stop period required to reduce (enhance) fuel consumption by automatically stopping the engine 2 is considered to be 5 seconds. It is noted that the fuel consumption efficient time period T is not limited to 5 seconds and may be arbitrary determined in consideration of a characteristic of an engine.

When the predicted stop period t is less than the fuel consumption efficient time period T (S440: No), at S444, the ISS control unit 40 determines whether the summation of the predicted stop period t, for which the vehicle stops at the stop point, and a predicted time before the vehicle stops at the stop point is greater than or equal to the fuel consumption efficient time period T.

When the summation of the predicted stop period t and the predicted time before the vehicle stops at the stop point is greater than or equal to the fuel consumption efficient time period T (S444: Yes), the ISS control unit 40 proceeds the processing to S442. At. S442, the ISS control unit 40 instructs the engine control unit 50 to stop the engine 2 before the vehicle stops at the stop point. Thus, the ISS control unit 40 terminates the present processing. In this way, the engine 2 can be stopped for the fuel consumption efficient time period T at shortest. Consequently, fuel consumption can be reduced by automatically stopping the engine 2.

When the summation of the predicted stop period t and the predicted time before the vehicle stops at the stop point is less than the fuel consumption efficient time period T (S444: No), the ISS control unit 40 determines that fuel consumption may contrary increase even when stopping the engine 2 before the vehicle stops at the stop point. In this case, at S446, the ISS control unit 40 instructs prohibition of engine stop to the engine control unit 50 so as not to stop the engine 2 before the vehicle stops or during the vehicle stops. Thus, the ISS control unit 40 terminates the present processing.

When the brake pedal is released after automatic stop of the engine, the ISS control unit 40 instructs the fuel injection valve to inject fuel so as to perform automatic start of the engine 2. In the first embodiment, the ISS learning unit 20 and the ISS control unit 40 are equivalent to a vehicle control device. The map information DB 100 is equivalent to a map information storage unit. The traveling information DB 110 is equivalent to a traveling information storage unit. The ISS learning unit 20 is equivalent to a stop point detection unit and a traveling information control unit. The ISS control unit 40 is equivalent to a stop determination unit.

The operation of S402 of FIG. 3 is equivalent to a function of the stop point detection unit. The operation of S404 to S416 is equivalent to a function of the traveling information control unit. The operation of S430 to S446 of FIG. 4 is equivalent to a function of the stop determination unit.

(Second Embodiment)

Figure 5:
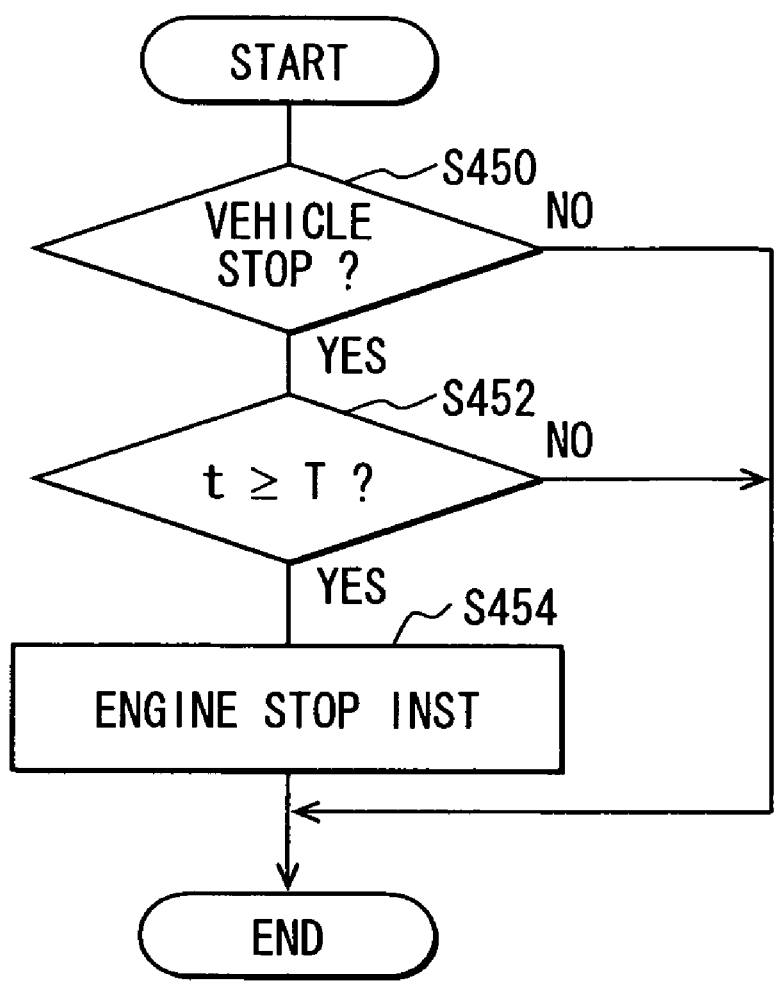
FIG. 5 is a flow chart showing a stop determination processing of the internal combustion engine according to a second embodiment.

FIG. 5 shows an engine stop determination processing according to the second embodiment. The engine stop determination processing of FIG. 5 is regularly executed. In FIG. 5, "S" represents "step".

At S450, the ISS control unit 40 determines whether the vehicle has stopped at a stop point. The ISS control unit 40 determines that the vehicle has stopped when the vehicle speed becomes zero. When the vehicle does not stop (S450: No), the ISS control unit 40 terminates the present processing.

When the vehicle stops (S450: Yes), at S452, the ISS control unit 40 determines whether the predicted stop period t is greater than or equal to the fuel consumption efficient time period T (for example, 5 seconds). When the predicted stop period t is less than the fuel consumption efficient time period T, the ISS control unit 40 determines that fuel consumption may contrary increase even when the ISS control unit 40 automatically stops the engine 2. In this case, the ISS control unit 40 terminates the present processing without stopping the engine 2 even though the vehicle has stopped.

As described above, according to the second embodiment, the fuel consumption efficient time period T is predetermined to 5 seconds in determination whether to automatically stop the engine 2 when the vehicle stops based on the traveling information stored in the traveling information DB 110. Further, the fuel consumption efficient time period T of 5 seconds is compared with the predicted stop period for which the vehicle is predicted to be stopping, similarly to the first embodiment. It is noted that the fuel consumption efficient time period T is not limited to 5 seconds and may be arbitrary determined in consideration of a characteristic of an engine.

When the predicted stop period t is greater than or equal to the fuel consumption efficient time period T (S452: Yes), the ISS control unit 40 determines that fuel consumption can be reduced by automatically stopping the engine 2. In this case, at S454, the ISS control unit 40 instructs the engine control unit 50 to stop the engine 2. Thus, the ISS control unit 40 terminates the present processing. In this way, the engine 2 is automatically stopped when the vehicle stops at the stop point. Thus, the engine 2 can be stopped at the stop point for at least the fuel consumption efficient time period T. Consequently, fuel consumption can be reduced by automatically stopping the engine 2.

In the second embodiment, the operation of S450 to S454 of FIG. 5 is equivalent to a function of the stop determination unit.

On the above embodiments, the vehicle itself determines whether to stop the engine 2 at a stop point based on the traveling information representing a stopping state at a stop point of the vehicle 120 and a state of passing by a stop point. In this way, even when another vehicle does not exist around the vehicle or even when the VICS (registered trademark) is not around the vehicle, the vehicle itself can appropriately determine whether to stops the engine 2 at a stop point.

(Other Embodiment)

In general, when the number of traveling to a stop point is small, reliability of the traveling information on the stop point may be low. Therefore, in the above embodiments, a normal (general) idle stop control to automatically stop the engine may be performed when the vehicle stops at a stop point, until the number traveling to the stop point becomes more than a predetermined number. Thereafter, when the number of traveling to the stop point becomes more than the predetermined number, the automatic stop control of the engine according to the above-described manner may be performed.

In the above embodiments, the ISS learning unit 20 and the ISS control unit 40 function as the stop point detection unit, the traveling information control unit, and the stop determination unit when a control program is executed. Alternatively, at least a part of the function of the units may be produced with a hardware having a circuit structure.

In this manner, the invention is not limited to the embodiments described above but is applicable to various embodiments within a scope not departing from the gist thereof.

Summarizing the above embodiments, a stop point detection unit is configured to detect a stop point at which a vehicle may stop while the vehicle travels, according to map information stored in a map information storage unit. A stop determination unit is configured to determine whether to stop an internal combustion engine at the stop point based on a state of the vehicle stopping at the stop point and a state of the vehicle passing by the stop point state stored as traveling information in the traveling information storage unit.

In this way, it is determined whether to stop the internal combustion engine at a stop point according to past traveling information on the self-vehicle at the stop point. Therefore, a user need not to set a stop point at which the user permits automatic stop of the internal combustion engine and a stop-pointed at which the user does not permit automatic, stop of the internal combustion engine. Consequently, a user need not to perform a complicated operation to set whether to stop the internal combustion engine at a stop point.

In addition, it is determined whether to automatically stop the internal combustion engine at a stop point according to the traveling information on the self-vehicle, without communications between the vehicle and another vehicle and communications between the vehicle and a road facility. Therefore, it is possible to determine whether to automatically stop the internal combustion engine without depending on surrounding vehicles or a road facility.

Furthermore, it is possible to statistically analyze the traveling information on the self-vehicle and determine whether to stop the internal combustion engine at a stop point according to the traveling information on the self-vehicle. Therefore, it is possible to appropriately determine whether to stop the internal combustion engine at the stop point.

The stopping state of the vehicle at a stop point is not limited to a stopping state when the vehicle stops at only one stop point. The stopping state may include a stopping state when the vehicle stops on a way between a stop point and a predetermined point in advance of the stop point for a predetermined distance. For example, when a stop point is a halt point (temporary stop point), a stopping state may be a state where the vehicle stops at only the holt point. Alternatively, when a stop point is an intersection with a signal light, a stopping state may be a state where the vehicle stops on a way from a stop line to a predetermined point in advance of the stop line for a predetermined distance.

The traveling information control unit is further configured to store in the traveling information storage unit the traveling information including: whether the vehicle stops at the stop point or passing by the stop point; a stop time and a stop period when the vehicle stops at the stop point; and a passing time when the vehicle passes by the stop point.

In this way, the stop time at which the vehicle stopped at the stop point and the passing time at which the vehicle has passed by the stop point are stored. Thereby, the traveling information of the stop point in each predetermined time period such as two or three hours including the stop time and the passing time can be statistically analyzed. Consequently, it is possible to determine whether to stop the internal combustion engine at the stop point in each predetermined time period with high accuracy.

Furthermore, the stop period for which the vehicle has stopped at a stop point is stored. Thereby, it is possible to appropriately determine whether to sop the internal combustion engine at the stop point according to the stop period.

The stop determination unit is further configured not to stop the internal combustion engine when the vehicle stops at the stop point, when determining that a stop period for which the vehicle stops at the stop point is less than a predetermined period based on the traveling information stored in the traveling information storage unit; and The stop determination unit is further configured to stop the internal combustion engine when the vehicle stops at the stop point, when determining that the stop period for which the vehicle stops at the stop point is greater than or equal to the predetermined period based on the traveling information stored in the traveling information storage unit.

In this way, stop of the internal combustion engine can be avoided at a stop point at which fuel consumption may contrary increase even when the internal combustion engine is automatically stopped since the vehicle immediately moves after the short stop period. Consequently, increase in fuel consumption caused by automatic stop of the internal combustion engine at a stop point can be avoided.

On the other hand, when it is determined that the vehicle stops at a stop point for a time period greater than or equal to the predetermined period, the internal combustion engine is sopped when the vehicle stops at the stop point. Thus, fuel consumption can be reduced by stopping the internal combustion engine.

The stop determination unit is further configured to stop the internal combustion engine before the vehicle stops at the stop point when:

determining that the stop period for which the vehicle stops at the stop point is greater than or equal to a predetermined period based on the traveling information stored in the traveling information storage unit; and determining that a possibility that the vehicle stops at the stop point is greater than or equal to a predetermined value based on the traveling information stored in the traveling information storage unit.

In this way, the internal combustion engine is stopped before the vehicle stops at a stop point. Thereby, the summation of a stop period of the internal combustion engine before the vehicle stops and a stop period of the internal combustion engine when the vehicle stops can be greater than a stop period sufficient to reduce fuel consumption by stopping the internal combustion engine. In this way, fuel consumption can be reduced even when fuel consumption contrary increases by stopping the internal combustion engine only at a stop point.

Furthermore, when the possibility of stopping at a stop point is high and when the stop period is greater than or equal to the predetermined period, the internal combustion engine is stopped before the vehicle stops. Thereby, the stop period of the internal combustion engine at the stop point can be increased as much as possible. When the stop period is sufficient to causes a fuel consumption reduction effect, the internal combustion engine is automatically stopped at the stop point. Thereby, the fuel consumption reduction effect can be further enhanced.

It is noted that when multiple approaching directions to approach a stop point exist, the traveling information on the vehicle including the state of the vehicle stopping at the stop point and the state of the vehicle passing by the stop point state may differ in dependence upon the approach direction. The traveling information control unit is further configured to store in the traveling information storage unit an approach direction, in which the vehicle approaches the stop point, as the traveling information. The stop determination unit is further configured to determine whether to stop the internal combustion engine based on the traveling information related to each approach direction and stored in the traveling information storage unit and according to the approach direction to the stop point when the vehicle stops at the stop point.

In this way, when the vehicle stops at the stop point, it is possible to appropriately determine whether to stop the internal combustion engine according to the approach direction to the stop point.

The functions of the units may be produced using a hardware resource having functions specified by a configuration thereof, a hardware resource having functions specified by a program, or a combination of the hardware resources. The functions of the units are not limited to be produced using hardware resources, which are physically individual from each other.

The above structures of the embodiments can be combined as appropriate.

The above processings such as calculations and determinations are not limited being executed by the ISS learning unit 20, the ISS control unit 40, and the engine control unit 50. The control unit may have various structures including the ISS learning unit 20, the ISS control unit 40, and the engine control unit 50 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle control device for a vehicle system configured to automatically stop an internal combustion engine of a vehicle when a predetermined stop condition is satisfied and automatically start the automatically stopped internal combustion engine when a predetermined start condition is satisfied, the vehicle control device comprising:

a stop point detection unit configured to detect a stop point, at which the vehicle has a high probability to stop while the vehicle travels, the stop point being included in map information stored in a map information storage unit;

a traveling information control unit configured to learn and to store traveling information, which includes a state of the vehicle on determination that the vehicle stops at the stop point and on determination that the vehicle passes by the stop point, in a traveling information storage unit; and a stop determination unit configured to determine whether to stop the internal combustion engine when the vehicle stops at the stop point based on the traveling information of the stop point stored in the traveling information storage unit.

2. The vehicle control device according to claim 1, wherein the traveling information control unit is further configured to store the traveling information in the traveling information storage unit, the traveling information including:

whether the vehicle stops at the stop point or the vehicle passes by the stop point;

a stop time and a stop period when the vehicle stops at the stop point; and a passing time when the vehicle passes by the stop point.

3. The vehicle control device according to claim 2, wherein the stop determination unit is further configured:

not to stop the internal combustion engine when the vehicle stops at the stop point, when determining that a stop period for which the vehicle stops at the stop point is less than a predetermined period based on the traveling information stored in the traveling information storage unit; and to stop the internal combustion engine when the vehicle stops at the stop point, when determining that the stop period for which the vehicle stops at the stop point is greater than or equal to the predetermined period based on the traveling information stored in the traveling information storage unit.

4. The vehicle control device according to claim 2, wherein the stop determination unit is further configured to stop the internal combustion engine before the vehicle stops at the stop point when:

determining that the stop period for which the vehicle stops at the stop point is greater than or equal to a predetermined period based on the traveling information stored in the traveling information storage unit; and determining that a probability that the vehicle stops at the stop point is greater than or equal to a predetermined value based on the traveling information stored in the traveling information storage unit.

5. The vehicle control device according to claim 1, wherein the traveling information control unit is further configured to store the traveling information in the traveling information storage unit, the traveling information including an approach direction in which the vehicle approaches the stop point, and the stop determination unit is further configured to determine whether to stop the internal combustion engine, when the vehicle stops at the stop point; based on the approach direction to the stop point and the traveling information stored in the traveling information storage unit, the traveling information corresponding to the approach direction.

6. A method for an idle stop control of a vehicle control device for a vehicle system configured to automatically stop an internal combustion engine of a vehicle when a predetermined stop condition is satisfied and automatically start the automatically stopped internal combustion engine when a predetermined start condition is satisfied, the method comprising:

detecting a stop point, which is included in map information and at which the vehicle has a high probability to stop, based on the map information, while the vehicle travels;

learning and storing traveling information in a traveling information storage unit which includes a state of the vehicle on determination that the vehicle stops at the stop point;

learning and storing traveling information in the traveling information storage unit which includes the state of the vehicle on determination that the vehicle passes by the stop point; and determining whether to stop the internal combustion engine, when the vehicle stops at the stop point, based on the traveling information of the stop point.

7. A non-transitory computer readable medium comprising instructions executed by a computer, the instructions including the method according to claim 6.

8. The method according to claim 6, wherein the stop point is at least one of an intersection without a traffic signal and a merging point with a priority road.

9. The method according to claim 6, wherein the traveling information includes an approach direction in which the vehicle approaches the stop point, the method further comprising:

determining whether to stop the internal combustion engine, when the vehicle stops at the stop point, based on the approach direction to the stop point and the traveling information stored in the traveling information storage unit, the traveling information corresponding to the approach direction.

10. The vehicle control device according to claim 1, wherein the stop point is at least one of an intersection without a traffic signal and a merging point with a priority road.

11. The vehicle control device according to claim 4, wherein the traveling information control unit is further configured to calculate the probability as a rate of a stop number, by which the vehicle stops at the stop point, to a summation of the stop number and a passing number, by which the vehicle passes by the stop point.

12. A vehicle control device for a vehicle system configured to automatically stop an internal combustion engine of a vehicle when a predetermined stop condition is satisfied and automatically start the automatically stopped internal combustion engine when a predetermined start condition is satisfied, the vehicle control device comprising:

a stop point detection unit configured to detect a stop point, at which the vehicle has a high probability to stop, while the vehicle travels, the stop point being included in map information stored in a map information storage unit;

a traveling information control unit configured to learn and to store traveling information, which includes a state of the vehicle on determination that the vehicle stops at the stop point and a state of the vehicle on determination that the vehicle passes by the stop point, in a traveling information storage unit;

a stop determination unit configured to determine whether to stop the internal combustion engine when the vehicle stops at the stop point based on the traveling information of the stop point stored in the traveling information storage unit, wherein the traveling information control unit is further configured to store the traveling information in the traveling information storage unit, the traveling information including an approach direction in which the vehicle approaches the stop point, and the stop determination unit is further configured to determine whether to stop the internal combustion engine, when the vehicle stops at the stop point, based on the approach direction to the stop point and the traveling information stored in the traveling information storage unit, the traveling information corresponding to the approach direction.

* * * * *